(12) United States Patent
Gutierrez et al.

(10) Patent No.: US 10,011,211 B1
(45) Date of Patent: Jul. 3, 2018

(54) SYSTEMS AND METHODS FOR GUIDING A BOAT TO A TRAILER

(71) Applicant: GM Global Technology Operations LLC, Detroit, MI (US)

(72) Inventors: Rex Gutierrez, Winnipeg (CA); Kyle Greene, Kitchener (CA); Yunfei Zhang, Pingdu (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/495,376

(22) Filed: Apr. 24, 2017

(51) Int. Cl.
- B60P 3/10 (2006.01)
- B60Q 1/00 (2006.01)
- B60Q 1/44 (2006.01)

(52) U.S. Cl.
CPC .......... *B60P 3/1075* (2013.01); *B60Q 1/0023* (2013.01); *B60Q 1/44* (2013.01)

(58) Field of Classification Search
CPC .... B60P 3/1075; B60P 3/1033; G60Q 1/0023; G60Q 1/44
USPC ........................................................ 315/77
See application file for complete search history.

(56) References Cited

U.S. PATENT DOCUMENTS

| | | | | |
|---|---|---|---|---|
| 5,949,329 A | * | 9/1999 | Woodard | B60P 3/1075 116/28 R |
| 7,679,493 B1 | * | 3/2010 | Moore | B60P 3/1033 340/431 |
| 9,744,895 B2 | * | 8/2017 | Wiegand | B60P 3/1075 |
| 2005/0263982 A1 | * | 12/2005 | Mickley | B60P 3/1075 280/414.1 |
| 2015/0061899 A1 | * | 3/2015 | Wiegand | B60P 3/1075 340/985 |
| 2016/0264220 A1 | * | 9/2016 | Lacey | H04N 5/2256 |
| 2017/0089697 A1 | * | 3/2017 | Shepard | G01B 21/22 |
| 2017/0341561 A1 | * | 11/2017 | Hess | B60P 3/1075 |

OTHER PUBLICATIONS

Rownbey8; "How not to load a boat Part-1". Online video clip. YouTube. Youtube, May 23, 2012. Web.

* cited by examiner

*Primary Examiner* — Dylan White

(57) ABSTRACT

A trajectory module is configured to determine a trajectory of a boat located in water behind a trailer that is hitched to a vehicle based on an image behind the vehicle captured using a rear facing camera of the vehicle. An illuminating module is configured to turn a right brake light of the vehicle ON and OFF when the trajectory of the boat is left of a longitudinal axis of the trailer and to turn a left brake light of the vehicle ON and OFF when the trajectory of the boat is right of the longitudinal axis of the trailer.

20 Claims, 9 Drawing Sheets

SYSTEMS AND METHODS FOR GUIDING A BOAT TO A TRAILER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to controlling lights of a vehicle to help guide a driver of a boat trailer the boat.

A vehicle may include a trailer hitch that is mounted to a structural portion of the vehicle, such as the chassis/frame of the vehicle. The trailer hitch allows the vehicle to tow various types of trailers and trailered items. For example, the vehicle may tow a boat on a boat trailer, a travel trailer, one or more bicycles, utility vehicles, off road vehicles (ORVs), etc.

The vehicle may also be equipped with a wire harness that can be connected to a wire harness of a trailer when the vehicle is towing the trailer. When the wire harnesses are connected, lights of the trailer may illuminate when lights of the vehicle illuminate. Also, when the wire harnesses are connected, manual brakes of the trailer may apply to slow the trailer when the vehicle applies its brakes.

SUMMARY

In a feature, a light control system of a vehicle is described. A trajectory module is configured to determine a trajectory of a boat located in water behind a trailer that is hitched to the vehicle based on an image behind the vehicle captured using a rear facing camera of the vehicle. An illuminating module is configured to selectively illuminate brake lights of the vehicle based on the trajectory of the boat, the selective illumination including: turning a right brake light of the vehicle ON and OFF when the trajectory of the boat is left of a longitudinal axis of the trailer; and turning a left brake light of the vehicle ON and OFF when the trajectory of the boat is right of the longitudinal axis of the trailer.

In further features, a trailer axis module is configured to determine the longitudinal axis of the trailer based on the image behind the vehicle captured using the rear facing camera of the vehicle.

In further features, the illuminating module is further configured to turn ON a center brake light of the vehicle that is located vertically above the left and right brake lights when a distance between the boat and the vehicle is less than a predetermined distance.

In further features, the illuminating module is further configured to turn reverse lights of the vehicle ON when the trajectory of the boat is aligned with the longitudinal axis of the trailer.

In further features, the illuminating module is configured to selectively illuminate the brake lights of the vehicle based on the trajectory when the distance between the boat and the vehicle is both (i) greater than the predetermined distance and (ii) less than a second predetermined distance, wherein the second predetermined distance is greater than the predetermined distance.

In further features, a distance module is configured to determine the distance between the boat and the vehicle based on light imaging and ranging (LIDAR) signals from rearward facing LIDAR sensors of the vehicle.

In further features, the illuminating module is configured to: turn the right brake light of the vehicle ON and OFF at a first rate when the trajectory of the boat is left of the longitudinal axis of the trailer by a first amount; and turn the right brake light of the vehicle ON and OFF at a second rate when the trajectory of the boat is left of the longitudinal axis of the trailer by a second amount, where the second amount is greater than the first amount and the second rate is faster greater than the first rate.

In further features, the illuminating module is configured to: turn the left brake light of the vehicle ON and OFF at a third rate when the trajectory of the boat is right of the longitudinal axis of the trailer by a third amount; and turn the left brake light of the vehicle ON and OFF at a fourth rate when the trajectory of the boat is right of the longitudinal axis of the trailer by a fourth amount, where the fourth amount is greater than the third amount and the fourth rate is faster greater than the third rate.

In a feature, a light control system of a vehicle is described. A dimensions module is configured to, based on an image behind the vehicle captured using a rear facing camera of the vehicle: determine a first dimension based on a first location of a first visual artifact that is located (i) on the exterior of a boat located in water behind a trailer that is hitched to the vehicle and (ii) to the right of a centerline of the boat; and determine a second dimension based on a second location of a second visual artifact that is located (i) on the exterior of the boat and (ii) to the left of the centerline of the boat. An illuminating module is configured to selectively illuminate brake lights of the vehicle based on the first and second dimensions, the selective illumination including: turning a right brake light of the vehicle ON and OFF when the first dimension is decreasing away from the second dimension; and turning a left brake light of the vehicle ON and OFF when the second dimension is decreasing away from the first dimension.

In further features, the illuminating module is further configured to turn ON a center brake light of the vehicle that is located vertically above the left and right brake lights when a distance between the boat and the vehicle is less than a predetermined distance.

In further features, the illuminating module is further configured to turn reverse lights of the vehicle ON when the first dimension is equal to the second dimension.

In further features, the illuminating module is configured to: turn the right brake light of the vehicle ON and OFF at a first rate when the first dimension is less than the second dimension by a first amount; and turn the right brake light of the vehicle ON and OFF at a second rate when first dimension is less than the second dimension by a second amount, where the second amount is greater than the first amount and the second rate is faster greater than the first rate.

In further features, the illuminating module is configured to: turn the left brake light of the vehicle ON and OFF at a third rate when the second dimension is less than the first dimension by a third amount; and turn the left brake light of the vehicle ON and OFF at a fourth rate when the second dimension is less than the first dimension by a fourth amount, where the fourth amount is greater than the third amount and the fourth rate is faster greater than the third rate.

In further features, a light control method for a vehicle includes: determining a trajectory of a boat located in water behind a trailer that is hitched to the vehicle based on an image behind the vehicle captured using a rear facing camera of the vehicle; and selectively illuminating brake lights of the vehicle based on the trajectory of the boat, the selectively illuminating including: turning a right brake light of the vehicle ON and OFF when the trajectory of the boat is left of a longitudinal axis of the trailer; and turning a left brake light of the vehicle ON and OFF when the trajectory of the boat is right of the longitudinal axis of the trailer.

In further features, the method further includes determining the longitudinal axis of the trailer based on the image behind the vehicle captured using the rear facing camera of the vehicle.

In further features, the selectively illuminating further includes turning ON a center brake light of the vehicle that is located vertically above the left and right brake lights when a distance between the boat and the vehicle is less than a predetermined distance.

In further features, the method further includes turning reverse lights of the vehicle ON when the trajectory of the boat is aligned with the longitudinal axis of the trailer.

In further features, the selectively illuminating includes selectively illuminating the brake lights of the vehicle based on the trajectory when the distance between the boat and the vehicle is both (i) greater than the predetermined distance and (ii) less than a second predetermined distance, wherein the second predetermined distance is greater than the predetermined distance.

In further features, determining the distance between the boat and the vehicle based on light imaging and ranging (LIDAR) signals from rearward facing LIDAR sensors of the vehicle.

In further features, the selectively illuminating includes: turning the right brake light of the vehicle ON and OFF at a first rate when the trajectory of the boat is left of the longitudinal axis of the trailer by a first amount; turning the right brake light of the vehicle ON and OFF at a second rate when the trajectory of the boat is left of the longitudinal axis of the trailer by a second amount, where the second amount is greater than the first amount and the second rate is faster greater than the first rate; turning the left brake light of the vehicle ON and OFF at a third rate when the trajectory of the boat is right of the longitudinal axis of the trailer by a third amount; and turning the left brake light of the vehicle ON and OFF at a fourth rate when the trajectory of the boat is right of the longitudinal axis of the trailer by a fourth amount, where the fourth amount is greater than the third amount and the fourth rate is faster greater than the third rate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
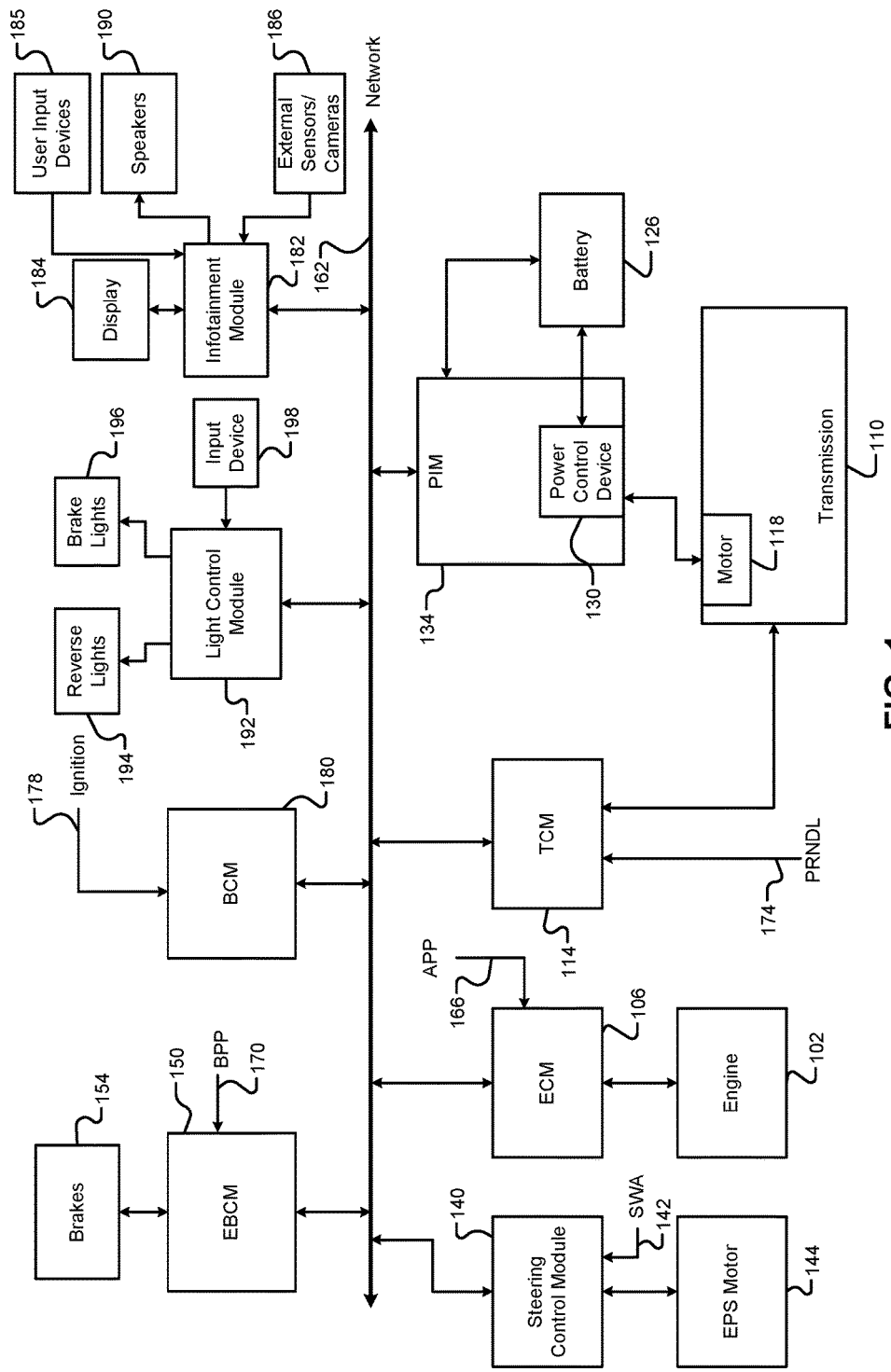
FIG. 1 is a functional block diagram of an example vehicle system.

Properly landing a boat on a trailer that is partially submerged under water is difficult, even for experienced boaters. Waves, wind, and/or other conditions may increase the difficulty of properly landing a boat on a trailer. It is not uncommon for a boat driver to make several unsuccessful attempts to properly land a boat on a trailer before properly landing the boat on the trailer, if the boat driver is even able to do so.

A light control module of a vehicle generally controls brake lights of the vehicle based on whether a brake pedal of the vehicle is being actuated. More specifically, the light control module illuminates the brake lights when the brake pedal is being actuated. The light control module does not illuminate the brake lights when the brake pedal is not being actuated.

The light control module also generally controls reverse lights of the vehicle based on whether a transmission of the vehicle is in a reverse gear or not. More specifically, the light control module illuminates the reverse lights when the transmission is in a reverse gear. The light control module does not illuminate the reverse lights when the transmission is not in a reverse gear.

According to the present disclosure, the lighting control module selectively illuminates the brake and reverse lights to help a boat driver guide a boat into a proper position on a boat trailer. More specifically, when the trajectory of the boat is to the left of the longitudinal axis of the boat trailer, the light control module flashes the right brake light of the vehicle ON and OFF to visually indicate to the boat driver to steer the boat to the right. When the trajectory of the boat is to the right of the longitudinal axis of the boat trailer, the light control module flashes the left brake light of the vehicle ON and OFF to visually indicate to the boat driver to steer the boat to the left. The light control module increases the frequency of the flashing as the deviation from the longitudinal axis of the boat trailer increases and vice versa.

When the trajectory of the boat falls on the same plane or line as the longitudinal axis of the boat trailer, the light control module illuminates the reverse lights to visually indicate to maintain the boat straight. When the boat is within a predetermined distance of the vehicle, the light control module illuminates a high center brake light to visually indicate that the boat is properly positioned on the trailer and to stop forward propulsion of the boat. Illuminating the high brake light may be useful as, when the boat is within the predetermined distance, the boat may obstruct the boat driver's view of the rear brake lights of the vehicle.

The illumination of the brake and reverse lights may help the boat driver to properly land the boat on the trailer. Also, the illumination of the brake and reverse lights may render a spotter useless and/or eliminate error associated with improper directions given by a spotter during an attempt to land the boat on the trailer. In boats that have off-center steering, the illumination of the brake and reverse lights may also help eliminate any error that may be associated with improper steering due to the driver being located off-center.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, and other types of vehicles. Also, while the example of a vehicle is provided, the present application is also applicable to non-vehicle implementations.

An engine 102 combusts an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system.

An electronic brake control module (EBCM) 150 may selectively control mechanical brakes 154 of the vehicle. Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) or another suitable range selector may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, and crank.

The vehicle system may also include an infotainment module 182. The infotainment module 182 controls what is displayed on a display 184 located within a passenger cabin of the vehicle. The display 184 may be a touchscreen display in various implementations and transmit signals indicative of user input to the display 184 to the infotainment module 182. The infotainment module 182 may additionally or alternatively receive signals indicative of user input from one or more other user input devices 185, such as one or more switches, buttons, knobs, etc.

The infotainment module 182 may receive input from a plurality of external sensors and cameras, generally illustrated in FIG. 1 by 186. For example, the infotainment module 182 may display video, various views, and/or alerts on the display 184 via input from the external sensors and cameras 186. The infotainment module 182 may also generate output via one or more other devices. For example, the infotainment module 182 may output sound via one or more speakers 190 of the vehicle.

The vehicle also includes a light control module 192 that controls illumination of various exterior lights of the vehicle. For example, the light control module 192 controls illumination of reverse lights 194 and brake lights 196 of the vehicle. The light control module 192 may also control illumination of other exterior lights of the vehicle. The reverse lights 194 may include one or more reverse lights located on each of the left and right sides of the vehicle. The brake lights 196 include one or more brake lights located on each of the left and right sides of the vehicle. The brake lights 196 also include one or more high brake lights located near a top of the vehicle, such as one or more brake lights located near the top of the vehicle and centered relative to a longitudinal axis of the vehicle.

The light control module 192 illuminates the reverse lights 194 when the transmission 110 is in a reverse drive gear. The light control module 192 may leave the reverse lights 194 off when the transmission 110 is not in the reverse drive gear (e.g., is in park, neutral, or a forward drive gear). For example, the light control module 192 may illuminate the reverse lights 194 when the position 174 indicates that the transmission 110 is to be in the reverse drive gear.

The light control module 192 illuminates the brake lights 196 when braking of the vehicle is being performed. The light control module 192 may leave the brake lights 196 off when braking of the vehicle is not being performed. For example, the light control module 192 may illuminate the brake lights 196 when the BPP 170 indicates that the brake pedal is depressed. The light control module 192 may leave the brake lights 196 off when the BPP 170 indicates that the brake pedal is not depressed. Braking may include braking via the mechanical brakes 154, regenerative braking via one or more electric motors, and/or one or more other types of vehicle braking.

The vehicle may include one or more additional control modules that are not shown, such as a chassis control module, a battery pack control module, etc. The vehicle may omit one or more of the control modules shown and discussed.

During operation of the vehicle, the brake lights 196 and the reverse lights 194 provide visual clues to drivers of other vehicles, pedestrians, etc. of how the vehicle is being operated. According to the present application, the light control module 192 illuminates the brake lights 196 and the reverse lights 194 to help a driver of a boat to trailer the boat on a trailer that is hitched to the vehicle. In other words, the light control module 192 illuminates the brake lights 196 and the reverse lights 194 to help the driver of the boat properly position the boat on a trailer that is hitched to the vehicle.

The light control module 192 illuminates the brake lights 196 and the reverse lights 194 to help the driver of the boat to trailer the boat in response to receipt of a predetermined user input to utilize the brake lights 196 and the reverse lights 194 to help trailer a boat. For example, a user may input the predetermined input via actuating a boat trailering button, switch, or other type of input device 198. The input device 198 may be a physical input device or a virtual input device displayed, for example, on the display 184. In various implementations, a user may input the predetermined user input via a mobile device (e.g., a cellular phone, tablet, etc.) and the light control module 192 may receive the predetermined input via a cellular network, a satellite communication network, or another suitable type of wireless connection.

Figure 2:
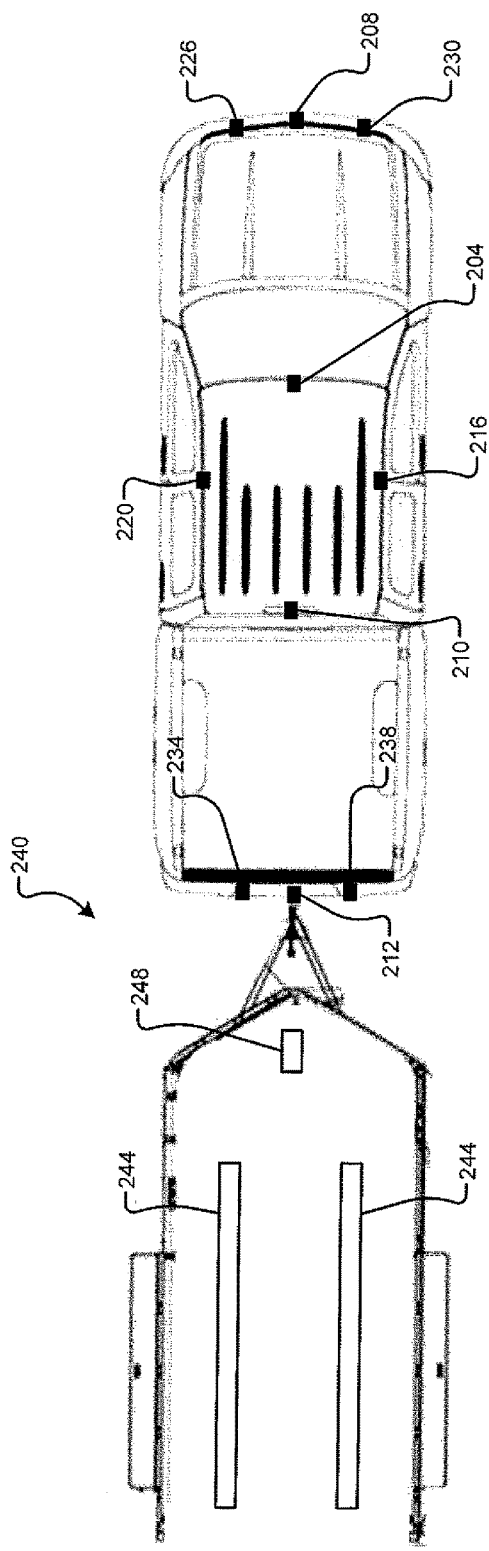
FIG. 2 is a functional block diagram of an example vehicle including examples of external sensors and cameras and a boat trailer hitched to the vehicle.

Referring now to FIG. 2, a functional block diagram of an example vehicle including examples of external sensors and cameras and a boat trailer hitched to the vehicle is presented. The external sensors and cameras 186 include various cameras positioned to capture images and video outside of (external to) the vehicle and various types of sensors measuring parameters outside of (external to the vehicle). For example, a forward facing camera 204 captures images and video of images within a predetermined field of view (FOV) in front of the vehicle.

A front camera 208 may also capture images and video within a predetermined FOV in front of the vehicle. The front camera 208 may capture images and video within a predetermined distance of the front of the vehicle and may be located at the front of the vehicle (e.g., in a front fascia, grille, or bumper). The forward facing camera 204 may be located more rearward, such as with a rear view mirror within a windshield of the vehicle. The forward facing camera 204 may not be able to capture images and video of items within all of or at least a portion of the predetermined FOV of the front camera 208 and may capture images and video that is greater than the predetermined distance of the front of the vehicle. In various implementations, only one of the forward facing camera 204 and the front camera 208 may be included.

A rear facing camera 210 captures images and video of images within a predetermined FOV behind the vehicle. A rear camera 212 captures images and video within a predetermined FOV behind the vehicle. The rear camera 212 may capture images and video within a predetermined distance behind vehicle and may be located at the rear of the vehicle, such as near a rear license plate. A right camera 216 captures images and video within a predetermined FOV to the right of the vehicle. The right camera 216 may capture images and video within a predetermined distance to the right of the vehicle and may be located, for example, under a right side rear view mirror. In various implementations, the right side rear view mirror may be omitted, and the right camera 216 may be located near where the right side rear view mirror would normally be located. A left camera 220 captures images and video within a predetermined FOV to the left of the vehicle. The left camera 220 may capture images and video within a predetermined distance to the left of the vehicle and may be located, for example, under a left side rear view mirror. In various implementations, the left side rear view mirror may be omitted, and the left camera 220 may be located near where the left side rear view mirror would normally be located. In various implementations, one or more of the FOVs may overlap, for example, for more accurate and/or inclusive stitching.

The external sensors and cameras 186 also include various other types of sensors, such as light detection and ranging (LIDAR) sensors. For example, the vehicle may include one or more forward facing LIDAR sensors, such as forward facing LIDAR sensors 226 and 230, and one or more rearward facing LIDAR sensors, such as rearward facing LIDAR sensors 234 and 238. The vehicle may also include one or more right side LIDAR sensors, one or more left side ultrasonic sensors, and/or one or more other types of exterior sensors. For example, ultrasonic radar sensors may be implemented in addition to or as an alternative to LIDAR sensors. The locations of the cameras and external sensors are provided as examples only and different locations could be used. LIDAR sensors output LIDAR signals around the vehicle. Presence (and non-presence) and locations of objects present around the vehicle can be determined based on the LIDAR signals from the LIDAR sensors.

Figure 3:
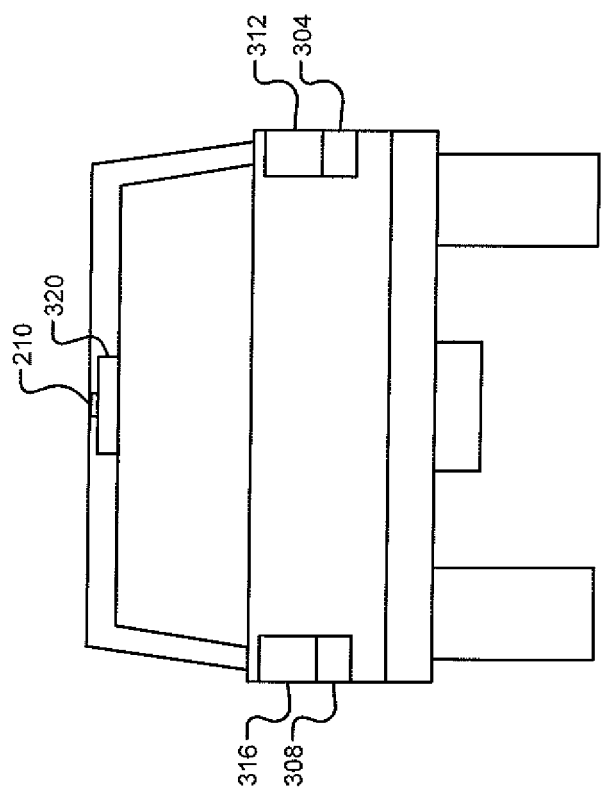
FIG. 3 is an example view of a vehicle from behind the vehicle.

FIG. 3 includes a functional block diagram of an example rear end of a vehicle. As stated above, the reverse lights 194 may include one or more reverse lights located on each of the left and right sides of the vehicle. For example, an example right reverse light 304 and an example left reverse light 308 is illustrated in FIG. 3. While the example of the right and left reverse lights 304 and 308 will be discussed, two or more reverse lights may be implemented on each of the right and left sides of the vehicle in various implementations.

The brake lights 196 include one or more brake lights located on each of the left and right sides of the vehicle. For example, an example right brake light 312 and an example left brake light 316 are illustrated in FIG. 3. While the example of the right and left brake lights 312 and 316 will be discussed, two or more rear brake lights may be implemented on each of the right and left sides of the vehicle in various implementations. The brake lights 196 also include one or more high brake lights located near a top of the vehicle. For example, an example center high brake light 320 is illustrated in FIG. 3. While the example of the center high brake light 320 will be discussed, two or more center high brake lights may be implemented in various implementations. The high brake light(s) are located relatively higher on the vehicle than the rear right and left brake lights.

Referring back to FIG. 2, as shown, the vehicle can tow a boat trailer 240. The boat trailer 240 is illustrated as hitched to the vehicle in FIG. 2. The boat trailer 240 includes one or more positioning members where a boat will rest upon the boat trailer 240. For example, trailers for single hull boats include two or more skids, such as skids 244, that cradle the hull of the boat will rest upon when the boat is on the boat trailer 240. Trailers may include additional and/or other types of positioning members. Some trailers, such as trailers for single hull boats may also include a winch 248 that can be used to pull a boat forward longitudinally, such as into engagement with a forward-most positioning member. While the example of a truck is provided, the present application is also applicable to other types of vehicles including cars, utility vehicles (SUVs, XUVs, etc.), etc.

Landing a boat on a boat trailer, however, can be difficult, even for experienced boaters. For example, it may be difficult to position the single hull of a single hull boat directly between the skids 244 of the boat trailer 240. Waves and wind may make positioning the boat on a boat trailer even more difficult. As used herein, boat landing (and landing a boat) refers to the act of properly positioning a boat on the positioning members of a boat trailer.

According to the present application, in response to the predetermined user input to aid boat landing, the light control module 192 determines whether a boat to be trailered on the boat trailer 240 is behind the vehicle and within a first predetermined distance of (e.g., the rear bumper of) the vehicle. The light control module 192 determines whether the boat to be trailered on the boat trailer 240 is behind the vehicle and within the first predetermined distance of the vehicle based on the LIDAR signals from the rearward facing LIDAR sensors, such as the rearward facing LIDAR sensors 234 and 238. The first predetermined distance may be, for example, a predetermined fraction or percentage (e.g., less than or equal to 1 or 100%) of a predetermined maximum range of the rearward facing LIDAR sensors.

When the boat is behind the vehicle and within the predetermined distance of the vehicle, the light control module 192 determines a trajectory of the boat from an image from the rear facing camera 210. The light control module 192 also determines a longitudinal axis of the boat trailer 240 on which the boat is to be landed from the image from the rear facing camera 210. When the trajectory of the boat is to the left of the longitudinal axis of the boat trailer 240, the light control module 192 flashes the right brake light 312 to visually indicate to the driver of the boat to turn the boat to the right for boat landing. When the trajectory of the boat is to the right of the longitudinal axis of the boat trailer 240, the light control module 192 flashes the left brake light 316 to visually indicate to the driver of the boat to turn the boat to the left for boat landing. When the trajectory of the boat falls along (or within a predetermined angle of) the longitudinal axis of the boat trailer 240, the light control module 192 may illuminate both of the right and left reverse lights 304 and 308 to visually indicate to the driver of the boat that the boat is on the proper course for boat landing.

When the boat is within a second predetermined distance of (e.g., the rear bumper of) the vehicle, the light control module 192 illuminates the center high brake light 320. The center high brake light 320 may be used in this case because the boat may visually obstruct the driver's view of the rear right and left brake lights 312 and 316 and the right and left reverse lights 304 and 308 when the boat is within the second predetermined distance of the vehicle.

The light control module 192 determines whether the boat is within the second predetermined distance of the vehicle based on the LIDAR signals from the rearward facing LIDAR sensors, such as the rearward facing LIDAR sensors 234 and 238. The second predetermined distance is less than the first predetermined distance and may correspond to where the boat is positioned at a forward most position on the boat trailer 240. The second predetermined distance may be, for example, a second predetermined fraction or percentage of the predetermined maximum range of the rearward facing LIDAR sensors. In various implementations, the light control module 192 may determine the second predetermined distance from the location of a forward most positioning member in the image from the rear facing camera 210.

Figure 4:
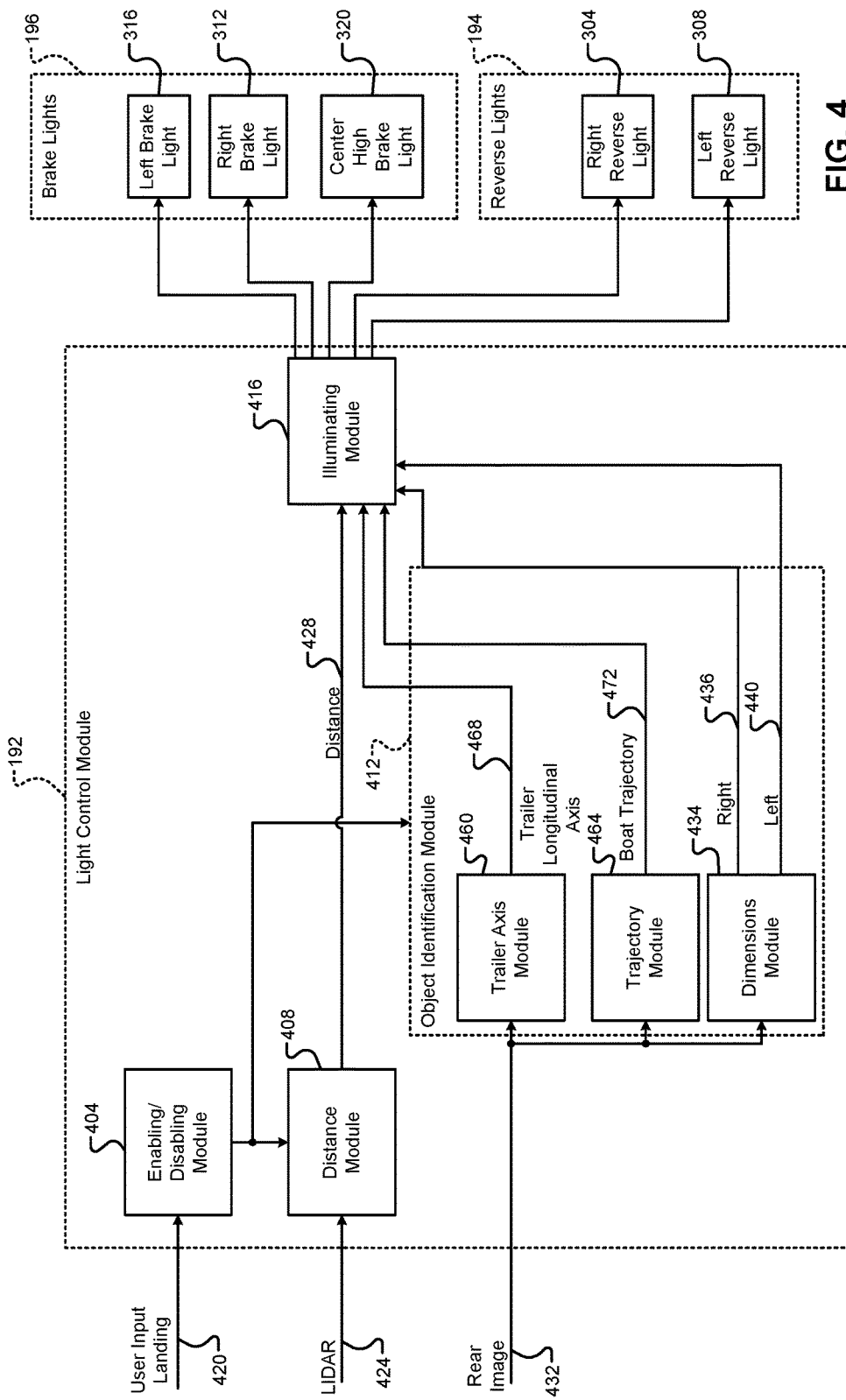
FIG. 4 is a functional block diagram of an example light control module.

FIG. 4 is a functional block diagram of an example implementation of the light control module 192. The light control module 192 includes an enabling/disabling module 404, a distance module 408, an object identification module 412, and an illuminating module 416.

The enabling/disabling module 404 enables and disables the distance module 408 and the object identification module 412. The enabling/disabling module 404 enables the distance module 408 and the object identification module 412 in response to receipt of the predetermined user input 420 for boat landing. As discussed above, the predetermined user input 420 for boat landing may be received for example, in response to user actuation of a physical switch or button of the vehicle, in response to user touching of the display 184, or wirelessly from a mobile device. Once enabled, the enabling/disabling module 404 may maintain the enablement until, for example, the ignition state 178 of the vehicle changes (e.g., to run, off, or crank). The enabling/disabling module 404 may then disable the distance module 408 and the object identification module 412 until the next time that the predetermined user input 420 is received.

When enabled, the distance module 408 determines whether a boat is within the first predetermined distance behind the vehicle based on the LIDAR signals 424 from the rearward facing LIDAR sensors, such as rearward facing LIDAR sensors 234 and 238. When a boat is within the first predetermined distance behind the vehicle, the distance module 408 determines a distance 428 between the boat and the rear of the vehicle. For example, the distance module 408 may determine the distance 428 between a closest point on the boat to the vehicle and a predetermined location of the vehicle, such as the trailer hitch of the vehicle. The distance module 408 determines the distance 428 based on the LIDAR signals 424 from the rearward facing LIDAR sensors, such as rearward facing LIDAR sensors 234 and 238.

When enabled, the object identification module 412 identifies one or more features in a rear image 432 captured using the rear facing camera 210. The rear facing camera 210 may capture and output rear facing images, such as the rear image 432, at a predetermined rate. The predetermined rate may be a predetermined video rate for producing video from the rear facing images in various implementations. The object identification module 412 may identify the one or more features in each of the rear images when enabled.

For example, the object identification module 412 may include a dimensions module 434 that identifies dimensions of one or more visual artifacts located on the boat in the rear image 432. For example, from the rear image 432, the dimensions module 434 may identify the left and right most edges of the boat using a predetermined object detection algorithm or a predetermined edge detection algorithm. The dimensions module 434 may also identify a centerline of the boat in the rear image 432. For example, in the example of a single hull boat, the dimensions module 434 may identify the hull shown in the rear image 432 as the centerline of the boat.

Based on the right most edge of the boat and the centerline of the boat, the dimensions module 434 may determine a right dimension 436. For example, the dimensions module 434 may set the right dimension 436 based on or equal to a distance between a point on the right most edge of the boat and a point on the centerline of the boat. Based on the left most edge of the boat and the centerline of the boat, the dimensions module 434 may determine a left dimension

440. For example, the dimensions module 434 may set the left dimension 440 based on or equal to a distance between a point on the left most edge of the boat and the point on the centerline of the boat.

In various implementations, the one or more visual artifacts identified by the dimensions module 434 may be stuck (affixed) to the boat by a user, such as an owner of the boat and/or an owner of the vehicle. For example, FIG. 5A includes an example front view of a single hull boat 504 having one artifact 508 including a plurality of individual artifacts stuck to the boat. The artifact 508 includes a centerline 512 (an artifact) that is stuck along the centerline of the boat 504 and above the waterline of the boat 504. The waterline of a boat is the line where the hull of the boat meets the surface of the water when the boat is in the water.

The artifact 508 also includes a left half (an artifact) 520 that is stuck to the left of the centerline of the boat 504 and a right half (an artifact) 516 that is stuck to the right of the centerline of the boat 504. The left half may include a first predetermined visual pattern, and the right half may include a second predetermined visual pattern that is different than the first predetermined visual pattern such that the right and left halves are distinguishable and identifiable in the rear image 432. Right and left are described relative to viewing the boat from in front of the boat from the point of view of the vehicle.

In the example of the artifact 508, the right dimension 436 may be a distance between the centerline of the boat 504 and the right-most edge of the right half of the artifact 508. The left dimension 440 may be a distance between the centerline of the boat 504 and the left-most edge of the right half of the artifact 508. Alternatively, the right dimension 436 may be an area of the right half of the artifact 508, and the left dimension 440 may be an area of the left half of the artifact 508.

Figure 5B:
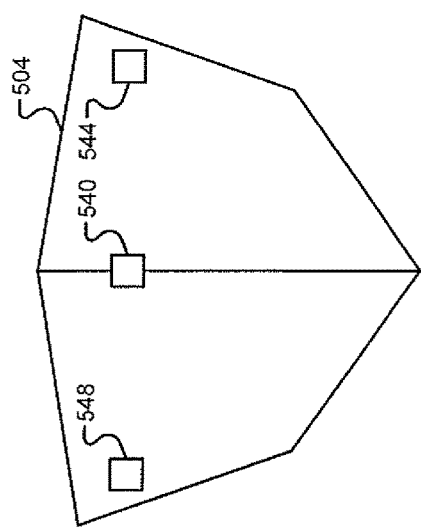
FIGS. 5A and 5B are example views of a boat from in front of the boat.
Figure 5A:
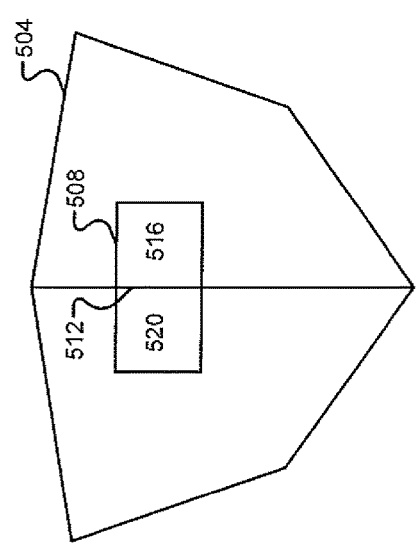

As another example, FIG. 5B includes an example front view of the single hull boat 504 having three artifacts stuck to the boat. The three artifacts include a center artifact 540 that is stuck along the centerline of the boat 504 and above the waterline of the boat 504. A centerline of the center artifact 540 may be stuck along the centerline of the boat 504. A right artifact 544 is stuck to the right of the centerline of the boat 504 and above the waterline of the boat 504. A left artifact 548 is stuck to the left of the centerline of the boat 504 and above the waterline of the boat 504. The right and left artifacts 544 and 548 may be stuck equal or unequal distances away from the centerline of the boat 504.

The center, right, and left artifacts 540, 544, and 548 may have the same or different predetermined visual patterns. In the example of the center, right, and left artifacts 540, 544, and 548, the right dimension 436 may be a distance between a center of the center artifact 540 and a center of the right artifact 544. The left dimension 440 may be a distance between a center of the center artifact 540 and a center of the left artifact 548. In various implementations, the distances between the center of the center artifact 540 and the centers of the right and left artifacts 544 and 548 may be learned from one or more of the rear images 432, such as one or more of the rear images 432 captured when the longitudinal axis of the boat 504 is aligned with the longitudinal axis of the vehicle. The right and left dimensions 436 and 440 may be normalized based on the learned distances to make the right and left dimensions 436 equal when the longitudinal axis of the boat is aligned with the longitudinal axis of the trailer and/or the longitudinal axis of the vehicle.

As the boat approaches the trailer, when the boat is properly aligned for boat landing (i.e., properly positioning the boat on the positioning members of the boat trailer), the right dimension 436 and the left dimension 440 should be equal. More specifically, when the longitudinal axis of the boat is aligned with the longitudinal axis of the trailer, the right dimension 436 and the left dimension 440 should be equal.

Referring back to FIG. 4, when the distance 428 is less than the first predetermined distance and greater than the second predetermined distance, the illuminating module 416 selectively illuminates the left brake light 316, the right brake light 312, the center high brake light 320, and the right and left reverse lights 304 and 308 based on the right and left dimensions 436 and 440. For example, the right dimension 436 being less than the left dimension 440 indicates that the trajectory of the boat is to the left of the longitudinal axis of the trailer. The illuminating module 416 therefore flashes the right brake light 312 ON for an ON period and OFF to indicate to the driver of the boat to steer the boat to the right. The illuminating module 416 illuminates the left brake light 316, the right brake light 312, the center high brake light 320, the right reverse light 304, and the left reverse light 308 by applying electrical power from a power source (e.g., a battery) to the respective lights.

Figure 6B:
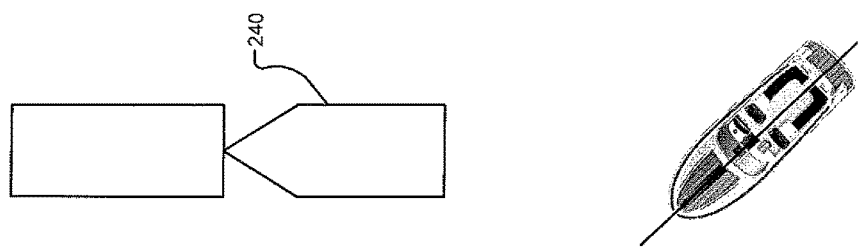
FIGS. 6A, 6B, 7A, 7B, and 8 are example overhead views including a boat approaching a trailer at various different trajectories.
Figure 6A:
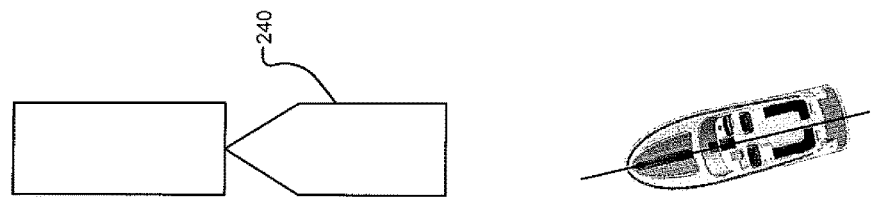

The illuminating module 416 determines the ON period based on the right and left dimensions 436 and 440. For example, the illuminating module 416 may increase the ON period for the right brake light 312 as the right dimension 436 approaches equality with the left dimension 440. The illuminating module 416 may decrease the ON period for the right brake light 312 as the right dimension 436 becomes increasingly less than the left dimension 440. In this way, the illuminating module 416 flashes the right brake light 312 more rapidly as leftward deviation of the longitudinal axis of the boat from the longitudinal axis of the trailer increases and vice versa. For example, the illuminating module 416 may flash the right brake light 312 more rapidly when a boat is positioned as shown in FIG. 6B than when the boat is positioned as shown in FIG. 6A.

The illuminating module 416 turns the right brake light 312 OFF between consecutive ON periods. For example, the illuminating module 416 may turn the right brake light 312 OFF for a predetermined period after each ON period. While flashing the right brake light 312 ON and OFF, the illuminating module 416 may maintain the left brake light 316, the center high brake light 320, and the right and left reverse lights 304 and 308 OFF.

Conversely, the left dimension 440 being less than the right dimension 436 indicates that the trajectory of the boat is to the right of the longitudinal axis of the trailer. When the distance 428 is less than the first predetermined distance and greater than the second predetermined distance, the illuminating module 416 therefore flashes the left brake light 316 ON for an ON period and OFF to indicate to the driver of the boat to steer the boat to the left.

Figure 7A:
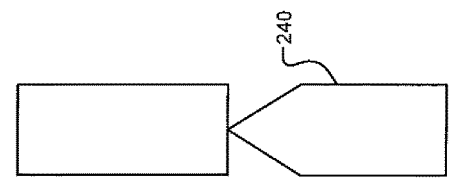
Figure 7A:
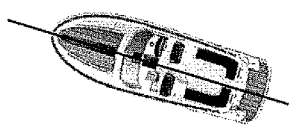
Figure 7B:
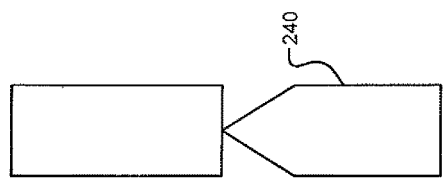
Figure 7B:
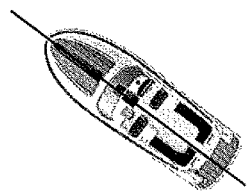

The illuminating module 416 determines the ON period based on the right and left dimensions 436 and 440. For example, the illuminating module 416 may increase the ON period for the left brake light 316 as the left dimension 440 approaches equality with the right dimension 436. The illuminating module 416 may decrease the ON period for the left brake light 316 as the left dimension 440 becomes increasingly less than the right dimension 436. In this way, the illuminating module 416 flashes the left brake light 316 more rapidly as rightward deviation of the longitudinal axis of the boat from the longitudinal axis of the trailer increases and vice versa. For example, the illuminating module 416 may flash the left brake light 316 more rapidly when a boat is positioned as shown in FIG. 7B than when the boat is positioned as shown in FIG. 7A.

The illuminating module 416 turns the left brake light 316 OFF between consecutive ON periods. For example, the illuminating module 416 may turn the left brake light 316 OFF for the predetermined period after each ON period. While flashing the left brake light 316 ON and OFF, the illuminating module 416 may maintain the left brake light 316, the center high brake light 320, and the right and left reverse lights 304 and 308 OFF.

Figure 8:
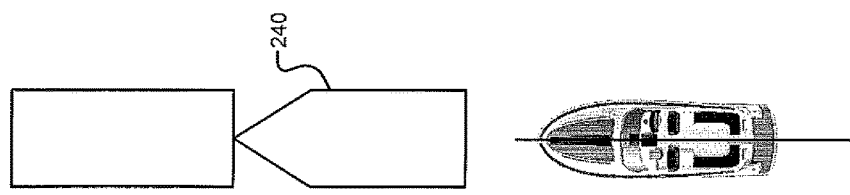

When the distance 428 is less than the first predetermined distance and greater than the second predetermined distance and the right dimension 436 and the left dimension 440 are equal, the illuminating module 416 may turn both the right and left reverse lights 304 and 308 ON. For example, the illuminating module 416 may turn both of the right and left reverse lights 304 and 308 ON when a boat is positioned as shown in FIG. 8. The illuminating module 416 maintains both the right and left reverse lights 304 and 308 ON until at least one of (i) the right dimension 436 and the left dimension 440 become unequal and (ii) the distance 428 becomes less than the second predetermined distance. While the right and left reverse lights 304 and 308 are ON, the illuminating module 416 may maintain the center high brake light 320 and the right and left brake lights 312 and 316 OFF.

Figure 9:
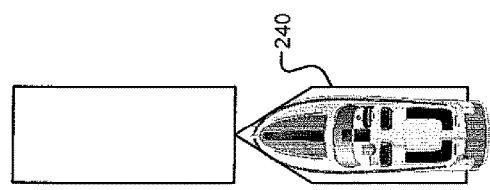
FIG. 9 is an example overhead view including a boat positioned on a trailer.

When the distance 428 is less than the second predetermined distance, the illuminating module 416 may turn the center high brake light 320 ON. For example, the illuminating module 416 may turn the center high brake light 320 ON when a boat is positioned on the trailer as shown in FIG. 9. While the center high brake light 320 is ON, the illuminating module 416 may maintain the right and left brake lights 312 and 316 OFF and maintain the right and left reverse lights 304 and 308 OFF.

In various implementations, the object identification module 412 may include a trailer axis module 460 and a trajectory module 464. The trailer axis module 460 determines a longitudinal axis 468 of the trailer based on one or more of the rear images including the trailer, such as the rear image 432. For example, from the rear image 432, the trailer axis module 460 may identify the left and right most edges of the trailer using a predetermined object detection algorithm or a predetermined edge detection algorithm. The trailer axis module 460 may determine the longitudinal axis 468 of the trailer as a line that is parallel to lines for the left and right most edges of the trailer and that is equidistant to and between both of the lines for the right and left most edges of the trailer.

The trajectory module 464 determines a trajectory 472 of the boat based on the orientation of the boat in the rear image 432. For example, from the rear image 432, the trailer axis module 460 may identify the boat in the rear image 432 using a predetermined object detection algorithm or a predetermined edge detection algorithm. The trajectory module 464 may determine the trajectory 472 of the boat based on the orientation of the center and sides of the boat identified in the rear image 432. The trajectory 472 of the boat is parallel to or coincident with the longitudinal axis of the boat. The longitudinal axis 468 of the trailer and the trajectory 472 of the boat may be expressed in terms of a common plane (e.g., the surface of the water) and using an X-Y coordinate system, such as centered at a center of the trailer.

In these implementations, when the distance 428 is less than the first predetermined distance and greater than the second predetermined distance, the illuminating module 416 selectively illuminates the left brake light 316, the right brake light 312, the center high brake light 320, and the right and left reverse lights 304 and 308 based on the right and left dimensions 436 and 440.

For example, the illuminating module 416 flashes the right brake light 312 ON for an ON period and OFF, as described above, when the trajectory 472 of the boat is to the left of the longitudinal axis 468 of the trailer. The illuminating module 416 determines the ON period as described above to such that the flashing increases as the trajectory 472 becomes increasingly left of the longitudinal axis 468 of the trailer and vice versa. The illuminating module 416 flashes the left brake light 316 ON for an ON period and OFF, as described above, when the trajectory 472 of the boat is to the right of the longitudinal axis 468 of the trailer. The illuminating module 416 determines the ON period as described above to such that the flashing increases as the trajectory 472 becomes increasingly right of the longitudinal axis 468 of the trailer and vice versa.

When the distance 428 is less than the first predetermined distance and greater than the second predetermined distance and the trajectory 472 of the boat is aligned (coincident) with the longitudinal axis 468 of the trailer, the illuminating module 416 may turn both the right and left reverse lights 304 and 308 ON. The illuminating module 416 maintains both the right and left reverse lights 304 and 308 ON until at least one of (i) the trajectory 472 deviates from the longitudinal axis 468 of the trailer and (ii) the distance 428 becomes less than the second predetermined distance. When the distance 428 is less than the second predetermined distance, the illuminating module 416 may turn the center high brake light 320 ON.

Figure 10:
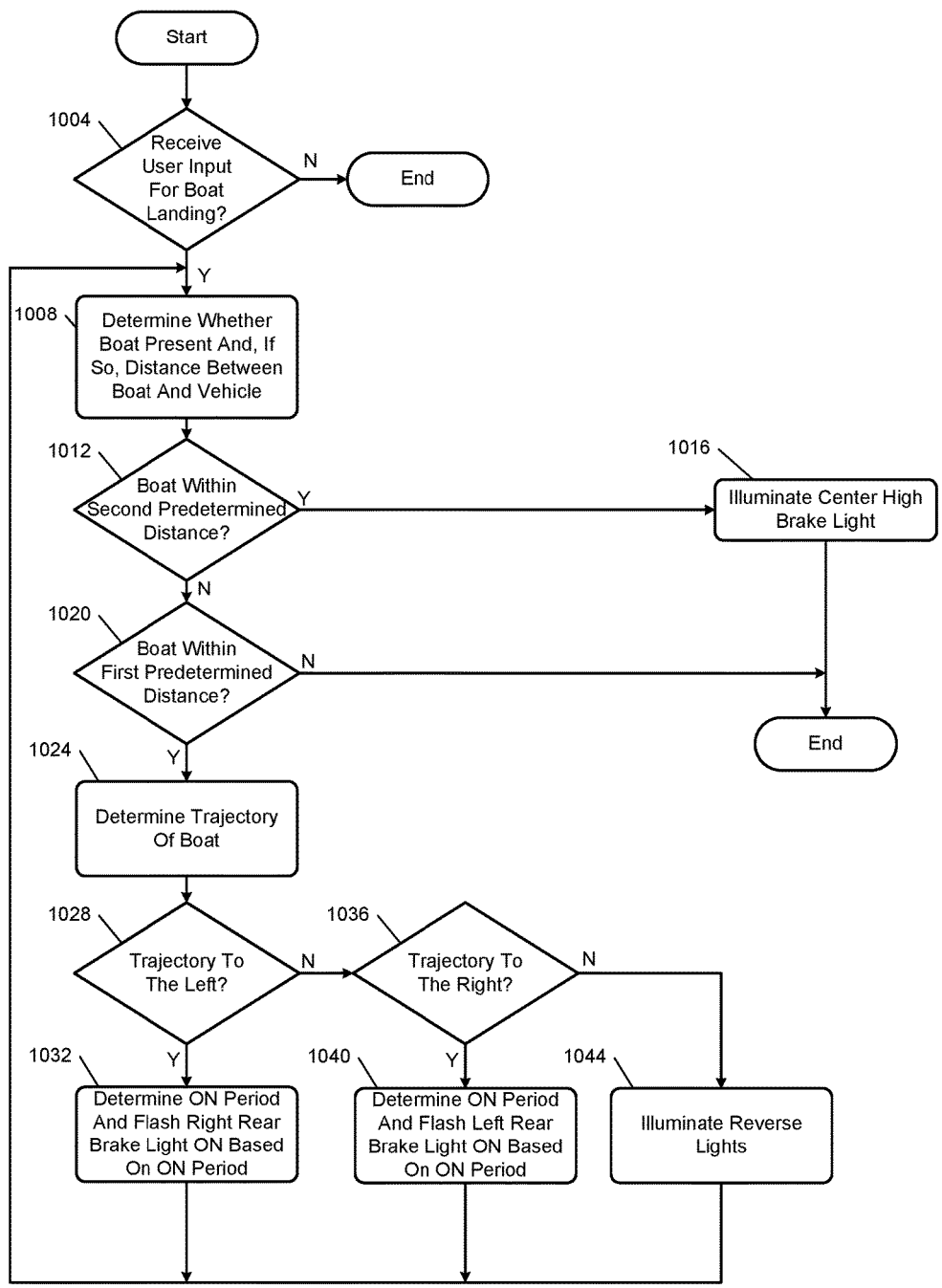
FIG. 10 is a flowchart depicting an example method of controlling brake and reverse lights of a vehicle to aid a driver of a boat to properly position the boat on a trailer.

FIG. 10 is a flowchart depicting an example method of selectively illuminating the left and right brake lights 316 and 312, the center high brake light 320, and the right and left reverse lights 304 and 308 to help a driver of a boat to guide the boat onto a trailer. Control begins with 1004. The ignition state 178 may be run, off, or accessory at 1004. At 1004, the enabling/disabling module 404 determines whether the predetermined user input for boat landing has been received. If 1004 is false, control may end. If 1004 is true, control may continue with 1008.

At 1008, the distance module 408 determines whether a boat is located behind the vehicle (and the trailer) and, if so, the distance 428. The distance module 408 determines whether a boat is located behind the vehicle and the distance 428 based on the LIDAR signals 424 from the rear facing LIDAR sensors, such as the rear facing LIDAR sensors 234 and 238.

At 1012, the illuminating module 416 determines whether the distance 428 is less than the second predetermined distance. If 1012 is true, the boat is located close to or at the front of the trailer, so the illuminating module 416 turns the center high brake light 320 ON at 1016 and control may end. If 1012 is false, control continues with 1020.

The illuminating module 416 determines whether the distance 428 is less than the first predetermined distance (yet greater than the second predetermined distance) at 1020. If 1020 is false, control may end. While the example of ending is provided, the example of FIG. 10 may be illustrative of one control loop and control may return to 1004. If 1020 is true, control continues with 1024.

At 1024, a rear image is received from the rear facing camera 210, and the trajectory module 464 may determine the trajectory 472 of the boat from the rear image. A new rear image is received and the trajectory 472 is updated each successive instance of 1024. In the first instance of 1024, the trailer axis module 460 may determine the longitudinal axis 468 of the trailer from the rear image. In various implementations, the dimensions module 434 may instead determine the right and left dimensions 436 and 440 using the received rear image at 1024.

At 1028, the illuminating module 416 may determine whether the trajectory 472 of the boat is to the left of the longitudinal axis 468 of the trailer. Alternatively, the illuminating module 416 may determine whether the right dimension 436 is less than the left dimension 440 at 1028. If 1028 is true, the illuminating module 416 determines an ON period for flashing the right brake light 312 ON and OFF and flashes the right brake light 312 ON for the ON period and OFF at 1032. The illuminating module 416 may maintain the other ones of the reverse and brake lights OFF. The illuminating module 416 may determine the ON period based on the trajectory 472 and the longitudinal axis 468 of the trailer. For example, the illuminating module 416 may increase the ON period as the trajectory 472 increasingly deviates from the longitudinal axis 468 of the trailer and vice versa. Alternatively, the illuminating module 416 may increase the ON period as the right dimension 436 decreases away from the left dimension 440 and vice versa. Control returns to 1008. If 1028 is false, control transfers to 1036.

At 1036, the illuminating module 416 may determine whether the trajectory 472 of the boat is to the right of the longitudinal axis 468 of the trailer. Alternatively, the illuminating module 416 may determine whether the left dimension 440 is less than the right dimension 436 at 1036. If 1036 is true, the illuminating module 416 determines an ON period for flashing the left brake light 316 ON and OFF and flashes the left brake light 316 ON for the ON period and OFF at 1040. The illuminating module 416 may maintain the other ones of the reverse and brake lights OFF. The illuminating module 416 may determine the ON period based on the trajectory 472 and the longitudinal axis 468 of the trailer. For example, the illuminating module 416 may increase the ON period as the trajectory 472 increasingly deviates from the longitudinal axis 468 of the trailer and vice versa. Alternatively, the illuminating module 416 may increase the ON period as the left dimension 440 decreases away from the right dimension 436 and vice versa. Control returns to 1008. If 1036 is false, control transfers to 1044.

At 1044, since the trajectory of the boat is aligned with the longitudinal axis of the trailer, the illuminating module 416 turns on both of the right and left reverse lights 304 and 308, and control returns to 1008. The illuminating module 416 may maintain the other ones of the brake lights OFF.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A light control system of a vehicle, comprising:
    a trajectory module configured to determine a trajectory of a boat located in water behind a trailer that is hitched to the vehicle based on an image behind the vehicle captured using a rear facing camera of the vehicle;
    an illuminating module configured to selectively illuminate brake lights of the vehicle based on the trajectory of the boat, the selective illumination including:
        turning a right brake light of the vehicle ON and OFF when the trajectory of the boat is left of a longitudinal axis of the trailer; and
        turning a left brake light of the vehicle ON and OFF when the trajectory of the boat is right of the longitudinal axis of the trailer.

2. The light control system of claim 1 further comprising a trailer axis module configured to determine the longitudinal axis of the trailer based on the image behind the vehicle captured using the rear facing camera of the vehicle.

3. The light control system of claim 2 wherein the illuminating module is further configured to turn ON a center brake light of the vehicle that is located vertically above the left and right brake lights when a distance between the boat and the vehicle is less than a predetermined distance.

4. The light control system of claim 3 wherein the illuminating module is further configured to turn reverse lights of the vehicle ON when the trajectory of the boat is aligned with the longitudinal axis of the trailer.

5. The light control system of claim 3 wherein the illuminating module is configured to selectively illuminate the brake lights of the vehicle based on the trajectory when the distance between the boat and the vehicle is both (i) greater than the predetermined distance and (ii) less than a second predetermined distance, wherein the second predetermined distance is greater than the predetermined distance.

6. The light control system of claim 5 further comprising a distance module configured to determine the distance between the boat and the vehicle based on light imaging and ranging (LIDAR) signals from rearward facing LIDAR sensors of the vehicle.

7. The light control system of claim 1 wherein the illuminating module is configured to:
    turn the right brake light of the vehicle ON and OFF at a first rate when the trajectory of the boat is left of the longitudinal axis of the trailer by a first amount; and
    turn the right brake light of the vehicle ON and OFF at a second rate when the trajectory of the boat is left of the longitudinal axis of the trailer by a second amount,
    wherein the second amount is greater than the first amount and the second rate is faster greater than the first rate.

8. The light control system of claim 7 wherein the illuminating module is configured to:
    turn the left brake light of the vehicle ON and OFF at a third rate when the trajectory of the boat is right of the longitudinal axis of the trailer by a third amount; and
    turn the left brake light of the vehicle ON and OFF at a fourth rate when the trajectory of the boat is right of the longitudinal axis of the trailer by a fourth amount,
    wherein the fourth amount is greater than the third amount and the fourth rate is faster greater than the third rate.

9. A light control system of a vehicle, comprising:
    a dimensions module configured to, based on an image behind the vehicle captured using a rear facing camera of the vehicle:
        determine a first dimension based on a first location of a first visual artifact that is located (i) on the exterior of a boat located in water behind a trailer that is hitched to the vehicle and (ii) to the right of a centerline of the boat; and
        determine a second dimension based on a second location of a second visual artifact that is located (i) on the exterior of the boat and (ii) to the left of the centerline of the boat; and an illuminating module configured to selectively illuminate brake lights of the vehicle based on the first and second dimensions, the selective illumination including:
- turning a right brake light of the vehicle ON and OFF when the first dimension is decreasing away from the second dimension; and
- turning a left brake light of the vehicle ON and OFF when the second dimension is decreasing away from the first dimension.

10. The light control system of claim 9 further comprising wherein the illuminating module is further configured to turn ON a center brake light of the vehicle that is located vertically above the left and right brake lights when a distance between the boat and the vehicle is less than a predetermined distance.

11. The light control system of claim 10 wherein the illuminating module is further configured to turn reverse lights of the vehicle ON when the first dimension is equal to the second dimension.

12. The light control system of claim 11 wherein the illuminating module is configured to:
- turn the right brake light of the vehicle ON and OFF at a first rate when the first dimension is less than the second dimension by a first amount; and
- turn the right brake light of the vehicle ON and OFF at a second rate when first dimension is less than the second dimension by a second amount,
- wherein the second amount is greater than the first amount and the second rate is faster greater than the first rate.

13. The light control system of claim 12 wherein the illuminating module is configured to:
- turn the left brake light of the vehicle ON and OFF at a third rate when the second dimension is less than the first dimension by a third amount; and
- turn the left brake light of the vehicle ON and OFF at a fourth rate when the second dimension is less than the first dimension by a fourth amount,
- wherein the fourth amount is greater than the third amount and the fourth rate is faster greater than the third rate.

14. A light control method for a vehicle, comprising:
- determining a trajectory of a boat located in water behind a trailer that is hitched to the vehicle based on an image behind the vehicle captured using a rear facing camera of the vehicle; and
- selectively illuminating brake lights of the vehicle based on the trajectory of the boat, the selectively illuminating including:
  - turning a right brake light of the vehicle ON and OFF when the trajectory of the boat is left of a longitudinal axis of the trailer; and
  - turning a left brake light of the vehicle ON and OFF when the trajectory of the boat is right of the longitudinal axis of the trailer.

15. The light control method of claim 14 further comprising determining the longitudinal axis of the trailer based on the image behind the vehicle captured using the rear facing camera of the vehicle.

16. The light control method of claim 15 wherein the selectively illuminating further includes turning ON a center brake light of the vehicle that is located vertically above the left and right brake lights when a distance between the boat and the vehicle is less than a predetermined distance.

17. The light control method of claim 16 further comprising turning reverse lights of the vehicle ON when the trajectory of the boat is aligned with the longitudinal axis of the trailer.

18. The light control method of claim 16 wherein the selectively illuminating includes selectively illuminating the brake lights of the vehicle based on the trajectory when the distance between the boat and the vehicle is both (i) greater than the predetermined distance and (ii) less than a second predetermined distance, wherein the second predetermined distance is greater than the predetermined distance.

19. The light control method of claim 18 further comprising determining the distance between the boat and the vehicle based on light imaging and ranging (LIDAR) signals from rearward facing LIDAR sensors of the vehicle.

20. The light control method of claim 14 wherein the selectively illuminating includes:
- turning the right brake light of the vehicle ON and OFF at a first rate when the trajectory of the boat is left of the longitudinal axis of the trailer by a first amount;
- turning the right brake light of the vehicle ON and OFF at a second rate when the trajectory of the boat is left of the longitudinal axis of the trailer by a second amount,
- wherein the second amount is greater than the first amount and the second rate is faster greater than the first rate;
- turning the left brake light of the vehicle ON and OFF at a third rate when the trajectory of the boat is right of the longitudinal axis of the trailer by a third amount; and
- turning the left brake light of the vehicle ON and OFF at a fourth rate when the trajectory of the boat is right of the longitudinal axis of the trailer by a fourth amount,
- wherein the fourth amount is greater than the third amount and the fourth rate is faster greater than the third rate.

* * * * *